United States Patent [19]

Davidovits et al.

[11] Patent Number: 5,798,307
[45] Date of Patent: Aug. 25, 1998

[54] ALKALINE ALUMINO-SILICATE GEOPOLYMERIC MATRIX FOR COMPOSITE MATERIALS WITH FIBER REINFORCEMENT AND METHOD FOR OBTAINING SAME

[75] Inventors: Joseph Davidovits, 16, rue Galilée, F-02100 Saint-Quentin; Michel Davidovics, Pont-Sainte-Maxence; Nicolas Davidovits, Roanne, all of France

[73] Assignees: Cordi-Geopolymere SA; Joseph Davidovits, both of Saint-Quentin, France

[21] Appl. No.: 836,099

[22] PCT Filed: Mar. 13, 1996

[86] PCT No.: PCT/FR96/00388

§ 371 Date: Apr. 29, 1997

§ 102(e) Date: Apr. 29, 1997

[87] PCT Pub. No.: WO96/28398

PCT Pub. Date: Sep. 19, 1996

[30] Foreign Application Priority Data

Mar. 15, 1995 [FR] France ................... 95/03015

[51] Int. Cl.$^6$ ................................. C01B 33/26
[52] U.S. Cl. ............................ 501/95.2; 423/328.1
[58] Field of Search ................ 501/95.2; 423/328.1, 423/329.1, 332; 588/252, 257; 405/128

[56] References Cited

U.S. PATENT DOCUMENTS

| | | | |
|---|---|---|---|
| 4,859,367 | 8/1989 | Davidovits | 106/600 |
| 4,888,311 | 12/1989 | Davidovits et al. | 501/153 |
| 5,342,595 | 8/1994 | Davidovits et al. | 423/328.1 |
| 5,349,118 | 9/1994 | Davidovits | 106/624 |
| 5,352,427 | 10/1994 | Davidovits et al. | 106/287.1 |
| 5,539,140 | 7/1996 | Davidovits | 106/624 |

FOREIGN PATENT DOCUMENTS

| | | |
|---|---|---|
| 2666328 | 3/1992 | France . |
| 9100027 | 7/1992 | France . |

*Primary Examiner*—Paul Marcantoni
*Attorney, Agent, or Firm*—Browdy and Neimark

[57] ABSTRACT

An alkali aluminosilicate geopolymeric matrix for the production of composite materials with a fiber reinforcement has a composition, after dehydration, expressed as oxides, as follows:

$$yM_2O:Al_2O_3:xSiO_2$$

where "x" is 6.5–70, "y" is 0.95–9.50 and M is Na, K or Na+K. The geopolymeric matrix comprises a nanocomposite material with at least two phases, with (a) a first nodular silicious phase composed of nanospheres with diameters of less than 1 micron, preferably less than 500 nm, and (b) a second polymeric phase essentially composed of alkali poly(aluminosilicate) having one or more sialate bridge (—Si—O—Al—O) cross-linking sites of total formula $M_4Si_2AlO_{10}$ to $M_2Si_4AlO_{16}$, such that, in the alkali poly (aluminosilicate), the ratio of $Si(O_4)$ to $Al(O_4)$ is >3.5, preferably >5. The geopolymeric matrix has a spectrum of $^{29}Si$ MASNMR with three resonance regions: $-87\pm5$ ppm, $-98 \pm5$ ppm, $-107 \pm5$ ppm, and prevents the oxidation at high temperatures of the carbon fibre. The resulting composite materials can be used at temperatures of up to 1000° C.

20 Claims, No Drawings

1

ALKALINE ALUMINO-SILICATE GEOPOLYMERIC MATRIX FOR COMPOSITE MATERIALS WITH FIBER REINFORCEMENT AND METHOD FOR OBTAINING SAME

BACKGROUND OF THE INVENTION

This application is a 371 of PCT/FR96/00388 filed Mar. 13, 1996.

Composite materials composed of a ceramic fiber reinforcement and a geopolymeric matrix are already known. Thus European Patent EP 0 288 502 (WO 88/02741) and its equivalent U.S. Pat. No. 4,888,311 describe fiber reinforced composite materials with a geopolymer matrix containing a geopolymer poly(sialate) M(—Si—O—Al—O—), with a ratio $(SiO_4):(AlO_4)=1$, or poly(sialate-siloxo) M(—Si—O—Al—O—Si—O—), with a ratio $(SiO_4):(AlO_4)=2$, and with fillers of dimension less than 5 microns and preferably less than 2 microns. Other geopolymers used as a matrix for fibrous composites are described in patent EP 0 518 980 (WO 91/13830), U.S. Pat. No. 5,342,595, for a geopolymer poly(sialate-disiloxo) M(—Si—O—Al—O—Si—O—Si—O—), with a ratio $(SiO_4):(AlO_4)=3$. Patent EP 0 518 962 (WO 91/13840), U.S. Pat. No. 5,352,427, describes a geopolymeric matrix poly(sialate-disiloxo) M(—Si—O—Al—O—Si—O—Si—O—), with a ratio $(SiO_4):(AlO_4)=3$, which contains a siliceous phase $SiO_2,H_2O$ of the Opal CT type and an alkali alumino-fluoride $M_3AlF_6$. According to the quantities of the Opal CT type siliceous phase $SiO_2,H_2O$ and of the alkali alumino-fluoride, the total ratio $SiO_2/Al_2O_3$ varies between 5.5 and 75, but the ratio $(SiO_4):(AlO_4)$ of the polymeric matrix poly(sialate-disiloxo) M(—Si—O—Al—O—Si—O—Si—O—) remains at all times equal to 3. In these two patents, the raw material used is a special silica dust called thermal silica. As can be seen in the publication PCT/WO 91/13840, page 3 lines 1 to 17 (U.S. Pat. No. 5,352,427, column 3, lines 2–22), for overall values of Si and Al such as the ratio Si:Al>6.5, the geopolymeric compound obtained is unstable at high temperature. It swells, showing the existence of a pure, highly fusible silicate phase, which has not been involved in the three-dimensional cross-linking. In the prior art, this serious drawback is remedied by adding certain products to allow hardening of the alkali silicate solutions, such as sodium fluosilicate $Na_2SiF_6$. Similarly, it can be seen in PCT WO 91/13830, page 7, line 40 and page 8 lines 1–11 (U.S. Pat. No. 5,342,595, column 7, lines 25–37) that a linear soluble (and fusible) alumino-silicate forms when $K_2O/Al_2O_3>1.30$. This is a major drawback which is eliminated by the addition of a stabilizing agent or any other hardening agent utilized in alkali silicate-based binders, in this particular case, zinc oxide ZnO in the proportions of 2.5% to 3.5% by weight of the matrix.

Certain ceramic fibers, and in particular those containing carbon, cannot be used at temperatures higher than 424° C. in air. Above this temperature, the carbon oxidizes and the mechanical strength of the reinforcement diminishes considerably. This phenomenon is well known in the previous art, as can be seen in the article "Fiber Reinforced Glasses and Glass-Ceramics for High Performance Applications", by K. M Prewo et al., American Ceramic Society Ceramic Bulletin, Vol. 65, n° 2, page 305, (1986). Similarly, for geopolymeric matrices in the prior art (WO 88/02741, WO 91/13830, WO 91/13840, U.S. Pat. No. 4,888,311, U.S. Pat. No. 5,342,595, U.S. Pat. No. 5,352,427), it is known that use of carbon fiber is limited to temperatures lower than 450° C.,

2 as can be seen in the article "Geopolymer: Ultra-High Temperature Tooling Material for the Manufacture of Advanced Composites", by J. Davidovits et al., 36th International SAMPE Symposium Proceedings (1991), USA, Vol. 36, page 1943, together with FIG. 8, page 1946.

In the prior art, in order to obtain a composite material which would be temperature-stable up to 1000° C., one of two techniques had to be employed: either special treatment of the carbon fiber by vapor phase deposition techniques (silicon carbide or silicon nitride vapor), or use of a SiC fiber reinforcement, for example of the Nicalon type. Now both the SiC fiber and the special treatment are very costly, which limits their applications. As a comparison, carbon fiber is 20 times cheaper than SiC Nicalon fiber.

BRIEF DESCRIPTION OF THE INVENTION

The object of the invention is the description of a geopolymeric matrix for the fabrication of thermostable composite materials composed of a fiber reinforcement. The invention describes a geopolymeric material which differs from those employed in the prior art, since it specifies use of a fibrous reinforcement composed of carbon fiber or graphite which can be used at temperatures up to 1000° C.

In one of the preferred methods of preparation of a geopolymeric matrix according to this invention, there is prepared a reaction mixture based on an alumino-silicate oxide of composition between $(2SiO_2,AlO_2)$ and $(34SiO_2, AlO_2)$ and an aqueous solution of alkali silicate, with mole ratios of reaction products expressed in terms of the oxide lying between:

$K_2O/SiO_2$ 0.08 and 0.145

$SiO_2/Al_2O_3$ 6.50 and 70

$K_2O/Al_2O_3$ 0.95 and 9.50

The mixture is allowed to stand and then hardened at a temperature between 60° C. and 200° C.

Although the geopolymeric matrix of this invention has ratios $SiO_2/Al_2O_3>6.5$ and $M_2O/Al_2O_3>1.3$, hardening occurs without the addition of any product previously used for hardening solutions of alkali silicates, unlike the prior art described above and in Table 1.

Table 1 shows the differences between matrices as in the prior art and the matrix of the present invention.

TABLE 1

| | Mole ratios of oxides in geopolymeric matrices (M is either K, Na or a mixture of K + Na). | | | |
|---|---|---|---|---|
| Mole ratio | WO 88/02741 | WO 91/13830 | WO 91/13840 | Present invention |
| $M_2O/SiO_2$ | 0.10–0.95 | 0.15–0.25 | 0.01–3.63 | 0.08–0.145 |
| $SiO_2/Al_2O_3$ | 2.50–6.00 | 5.50–6.50 | 5.50–75 | 6.5–70 |
| $M_2O/Al_2O_3$ | 0.20–5.70 | 1.00–1.60 | 1.00–20 | 0.95–9.50 |
| $F^-/Al_2O_3$ | 0 | 0 | 0.50–50 | 0 |
| ZnO | 0 | 2.5%–3.5% by weight | 0 | 0 |

The geopolymeric alkali alumino-silicate matrix has a composition after dehydration expressed in terms of the oxides as follows:

$yM_2O:Al_2O_3:xSiO_2$ where "x" has a value between 6.5 and 70, "y" has a value between 0.95 and 9.50 and "M" is either K, Na or a mixture of K+Na.

The geopolymeric matrix is composed of a nanocomposite. A nanocomposite is a material containing at least two components, of which at least one is visible under a microscope, and has a dimension of the order of tens or hundreds of manometers. The nanocomposite according to this invention contains at least two phases with a) a primary nodular siliceous phase composed of nanospheres of diameter less than 1 micron, and preferably less than 500 nm.

b) a second polymeric phase, composed essentially of alkali poly(alumino-silicate) with at least one, or several cross-link sites per sialate bridge (—Si—O—Al—O—), the said cross-link site having an empirical formula between $M_4Si_2AlO_{10}$ and $M_2Si_4AlO_{16}$, such that in this alkali poly(alumino-silicate), the ratio $Si(O_4):Al(O_4)$ is >3.5, and preferably >5.

Geopolymers are in general amorphous to X-rays and the X-ray diffraction method cannot be used to characterize a geopolymeric matrix. According to the prior art, the best method is to use Nuclear Magnetic Resonance spectroscopy in solid phase MAS-NMR of $^{29}Si$ and $^{27}Al$. In the geopolymeric matrix, the nuclear magnetic resonance spectrum MAS-NMR $^{29}Si$ has three resonance zones: the first at −87±5 ppm corresponding to a $SiO_4$ of the type $Q_2(2Si, 2OH)$, i.e. a linear hydrated poly(silicate); the second at −98±5 ppm corresponding to a $SiO_4$ of the type $Q_3(3Si, 1OH)$, i.e. a hydrated branched poly(silicate), and also $Q_4(3Si,1Al)$, i.e. a three-dimensional poly(alumino-silicate) (this resonance being related to the second polymeric phase of the nanocomposite); and the third at −107±5 ppm corresponding to a $SiO_4$ of the type $Q_4(4Si)$, i.e. poly(silicic) acid $(SiO_2)_n$ (this resonance being related to the first nodular siliceous phase of the nanocomposite).

The second polymeric phase is entirely amorphous under the microscope. It corresponds to a poly(alumino-silicate) in which the chains of linear poly(silicate) are more or less cross-linked by a sialate bridge (—Si—O—Al—O—). The sialate bridge cross-linking can also be interpreted as the site of bonding between the poly(silicate) chains and the surface of the nanospheres of the nodular siliceous phase. The sialate bridge density or the cross-link site density can be expressed by the ratio $Si(O_4):Al(O_4)$. When the latter is less than 3.5, the geopolymeric matrix is considered to be similar to that of the prior art; in the scope of the present invention, this ratio is greater than 3.5. It is preferably greater than 5 and can reach 70. The sialate bridge cross-link sites have an empirical formula varying between $M_4Si_2AlO_{10}$, $M_3Si_3AlO_{13}$ and $M_2Si_4AlO_{16}$. In the geopolymeric matrix, the $^{27}Al$ nuclear magnetic resonance spectrum is attributed to the second phase. This has a resonance varying between 70±5 ppm, 65±5 ppm et 55±5 ppm, indicating that the aluminum coordination is $AlO_4$, of the type $AlQ_4(2Si)$, $AlQ_4(3Si)$ and $AlQ_4(4Si)$, respectively.

DESCRIPTION OF THE PREFERRED EMBODIMENTS

The alkali alumino-silicate geopolymeric matrix for composite materials, according to the present invention, is a nanocomposite containing 60 to 95 parts by weight of the nodular siliceous phase and 05 to 40 parts by weight of the polymeric poly(alumino-silicate) phase.

A highly surprising consequence of the use of the geopolymeric matrix is that it protects fibers against oxidation and degradation in air up to 1000° C. Still more remarkable is the fact that to obtain this property, no special treatment of the carbon fiber or graphite is necessary. It is assumed that, in the present invention, protection of the carbon fiber against oxidation is the result of two phenomena. Firstly, between 300° C. and 600° C. the matrix expands owing to the release of the remaining water of composition and thus prevents penetration of ambient oxygen. At the same time, it is also assumed that the siliceous phase reacts with the surface of the carbon fiber, forming an interface containing silicon carbide SiC, with the likely release of carbon dioxide $CO_2$ which also prevents oxidation. The degree of expansion is obviously a function of the cross-linking density in the polymeric phase, i.e. the number of sialate bridges (—Si—O—Al—O—) linking together the poly(silicate) chains and the surfaces of the siliceous nanospheres. However, complete cross-linking of the polymeric phase is to be avoided since, as is known from the prior art, when the geopolymer is totally cross-linked three-dimensionally, with a ratio $Si(O_4):Al(O_4)=3.5$ or <3.5, the carbon fiber is no longer protected against oxidation.

The nanocomposite making up the geopolymeric matrix consists of a primary nodular siliceous phase composed of nanospheres of diameter less than 1 micron, and preferably less than 500 nm. These nanospheres are amorphous alumino-silicate compounds obtained by condensing and cooling SiO and AlO vapors produced at temperatures higher than 2000° C. According to the raw material and fabrication process used, the alumino-silicate oxide powder will contain a more or less larger quantity of aluminum oxide with an amorphous structure totally different from that of $Al_2O_3$. To denote this special structure, we write the formula of the alumino-silicate, e.g. $(24SiO_2.AlO_2)$. One example of the alumino-silicate used to produce the geopolymeric matrix of the invention is that of the mineral known as "thermal silica", referred to in the prior art. Thus, in Patent EP 0 518 980 page 3 lines 46–53 (U.S. Pat. No. 5,342,595, column 3, lines 22–29) is stated: "In a preferred example of the invention, the thermal silica fume is prepared by electro-fusion of zircon sand. The obtained thermal silica fume contains at most 10% by weight of $Al_2O_3$ and at least 90% by weight of $SiO_2$. It has an empirical formula comprised between $(13SiO_2.AlO_2)$ and $(16SiO_2.AlO_2)$, representing an alumino-silicate oxide with Al in coordination (IV), with additional amorphous silica $SiO_2$." In order to take more explicitly into account the amorphous silica, we now include it in the empirical formula which thus lies between $(24SiO_2.AlO_2)$ et $(34SiO_2.AlO_2)$. Another example of alumino-silicate oxide is that obtained by treatment at 2300° C.–2500° C. of powder containing silica and alumina. On injecting an aluminum silicate powder containing, for example, 65% by weight of $SiO_2$, 23% by weight of $Al_2O_3$, into a plasma torch furnace, the powder volatilises at the high temperature and SiO and AlO vapors condense on the cooled walls in the form of nanospheres with an amorphous structure, whose empirical formula lies between $(2SiO_2.AlO_2)$ and $(6SiO_2.AlO_2)$. By varying the proportions of silica and alumina, it is possible to produce amorphous alumino-silicate nanospheres with an empirical formula varying between $(2SiO_2.AlO_2)$ and $(34SiO_2.AlO_2)$. Nanospheres produced either by electrofusion or by plasma torch all show the same particularity: if they are placed in an alkali solution, e.g. KOH, the alkali solution becomes richer in aluminum atoms, with formation of soluble potassium aluminate. But the amount of dissolved $AlO_2$ is at least 50% less than the amount present in the nanospheres. It can be deduced that part of the $AlO_2$ is still inside the nanosphere, or more probably at the surface (and therefore reactive). In the reaction mixtures of this invention, the reactive potassium aluminate will lie either at the surface of the nanosphere, or already in solution, according to the initial concentration of $AlO_2$ in the nanosphere. It is through this potassium aluminate that sialate bridges (—Si—O—Al—O—) and cross-link sites will be created in the polymeric phase.

In order to ensure a constant degree of cross-linking, and thus better high-temperature performance, it is often advantageous to add to the reaction mixture a solution of finely dispersed alkali oligo-sialate, for example K-{(OH)$_3$—Si—O—Al(OH)$_3$}. The alkali oligo-sialate is obtained by dispersal in a solution of alkali silicate a hydrated alumino-silicate, e.g. kaolinite (2SiO$_2$,Al$_2$O$_3$,2H$_2$O), with aluminum in the coordination (AlO$_6$). The alumino-silicate oxide used in the fabrication of geopolymers by the prior art, such as (Si$_2$O$_5$,Al$_2$O$_2$) in which the cation Al is in coordination (IV–V), is not suitable in the present invention. This oxide (Si$_2$O$_5$,Al$_2$O$_2$) contains twice as much Al as the nanosphere (2SiO$_2$,AlO$_2$); furthermore, in the previous dissolution test in an alkali solution of KOH, almost all the Al went into solution; it is therefore too reactive and reacts almost immediately; there is immediate formation of a three-dimensional network totally different from the cross-linking sites described in the invention, since it provides no protection to the carbon fiber against oxidation at high temperature. The alkali oligo-sialate solutions of the invention, on the other hand, are in the form of a suspension which is stable with respect to time, and the geopolymeric matrix does protect the carbon fiber against oxidation.

A preferred process for the preparation of the geopolymeric matrix consists of preparing and allowing to stand a reaction mixture made up of alumino-silicate oxide with composition between (2SiO$_2$,AlO$_2$) and (34SiO$_2$,AlO$_2$), and of an aqueous alkali silicate solution with mole ratios of reaction products expressed in terms of oxide lying between:

K$_2$O/SiO$_2$  0.08 and 0.145

SiO$_2$/Al$_2$O$_3$  6.50 and 70

K$_2$O/Al$_2$O$_3$  0.95 and 9.50 and then allowing to harden at a temperature between 60° C. and 200° C., without addition of any known product for the hardening of alkali silicate solution.

When the said alumino-silicate oxide has a composition lying between (24SiO$_2$,AlO$_2$) et (34SiO$_2$,AlO$_2$), there is added to 100 parts by weight of the said aqueous solution of alkali silicate, between 0 to 40 parts by weight, and preferably between 5 and 30 parts by weight, a hydrated alumino-silicate with the cation Al in coordination (AlO$_6$), such that the mole ratios of the reaction products expressed in terms of oxide lie between M$_2$O/SiO$_2$: 0.097 and 0.11

SiO$_2$/Al$_2$O$_3$: 10 and 55

M$_2$O/Al$_2$O$_3$: 0.97 and 6.1

Hardening is then carried out between 60° C. and 200° C.

The alkali alumino-silicate geopolymeric matrix, after dehydration, has a composition expressed in terms of oxides of:

yM$_2$O:Al$_2$O$_3$:xSiO$_2$ in which "x" is a value between 6.5 and 70, "y" is a value between 0.95 and 9.5, "M" being either Na, K or a mixture of Na+K.

The sialate bridge cross-linking sites have an empirical formula varying from M$_4$Si$_2$AlO$_{10}$, M$_3$Si$_3$AlO$_{13}$ and M$_2$Si$_4$AlO$_{16}$. In the geopolymeric matrix, the nuclear magnetic resonance spectrum, $^{27}$Al MASNMR is attributed to the second phase.

Following the standard terminology for alkaline geopolymers, the cross-linking site of empirical formula M$_4$Si$_2$AlO$_{10}$ can be written AlO$_4$:2SiO$_3$:M$_4$, i.e. alkaline (M$_4$) disiloxo - (2SiO$_3$) aluminate (AlO$_4$). It exhibits a resonance at 70±5 ppm indicating that the coordination of the aluminum is AlO$_4$, of the type AlQ$_4$(2Si). The compound of empirical formula M$_4$Si$_2$AlO$_{10}$ therefore has the following structure (where M is K):

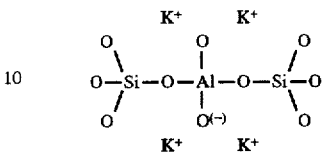

i.e. the oligo(disiloxo-aluminate) of potassium, abbreviated to K$_4$-(A2S).

The cross-linking site with empirical formula M$_3$Si$_3$AlO$_{13}$ can be written AlO$_4$:3SiO$_3$:M$_3$, i.e. alkali (M$_3$) disiloxo - (3SiO$_3$) aluminate (AlO$_4$). It exhibits a resonance at 65±5 ppm indicating that the coordination of the aluminum is AlO$_4$, of the type AlQ$_4$(3Si). The compound of empirical formula M$_3$Si$_3$AlO$_{13}$ therefore has the following structure (where M is K):

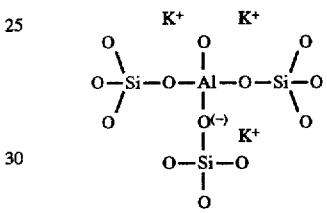

i.e. the oligo(trisiloxo-aluminate) of potassium, abbreviated to K$_3$-(A3S).

The cross-linking site with empirical formula M$_2$Si$_4$AlO$_{16}$ can be written AlO$_4$:4SiO$_3$:M$_2$, i.e. alkali (M$_2$) disiloxo-(4SiO$_3$) aluminate (AlO$_4$). It exhibits a resonance at 55±5 ppm indicating that the coordination of the aluminum is AlO$_4$, of the type AlQ$_4$(32Si). The compound of empirical formula M$_2$Si$_4$AlO$_{16}$ therefore has the following structure (where M is K):

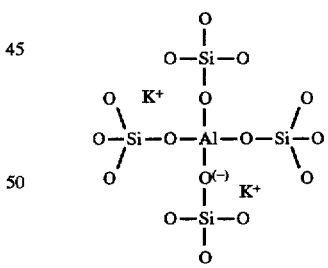

i.e. the oligo(tetrasiloxo-aluminate) of potassium, abbreviated to K$_2$-(A4S).

The following examples serve to illustrate the invention. They have no limiting character on the scope of the invention as presented in the claims. Oxide ratios are mole ratios, and indicated parts are by weight.

EXAMPLE 1

245 grammes of a reaction mixture are prepared containing:

H$_2$O: 3.5 moles;

K$_2$O: 0.276 moles;

SiO$_2$: 2.509 moles;

Al$_2$O$_3$: 0.039 moles

The $Al_2O_3$ is from an amorphous aluminosilicate oxide prepared by electrofusion of natural alumino-silicate, its mean formula lying between ($24SiO_2.AlO_2$) and ($34SiO_2$, $AlO_2$); the $SiO_2$ comes from this aluminosilicate oxide and a solution of potassium silicate with a mole ratio $K_2O/SiO_2$ close to 1; $K_2O$ comes from potassium silicate. The mole ratios of reacting oxides are:

$K_2O/SiO_2$ 0.11

$SiO_2/Al_2O_3$ 64.33

$K_2O/Al_2O_3$ 7.07

The mixture is allowed to stand for 1 to 2 hours and afterwards used to impregnate a carbon fiber fabric of orientation 0/90, where the fiber is of the type 3K PAN. The ratio after spin drying between fiber weight and resin weight is 45/55 respectively. A composite of approximate thickness 6 mm containing 22 layers of impregnated fabric is prepared, and this is then placed in a vacuum-bag at ambient temperature for 60 minutes in order to remove as much water as possible. The composite is next placed in a heating press at 80° C. for 3 hours. Flexural and shear strengths are measured at ambient temperature, then after one hours at various temperatures. The results are shown in tables 2 and 3:

TABLE 2

| Flexural strength at 20° C. and after 1 hour at 800° C. | | |
|---|---|---|
| Temperature | 20° C. | 800° C. |
| Applied force | 625 N | 390 N |
| Flexural strength | 245 MPa | 65 MPa |

The decrease in flexural strength after 1 hour at 800° C. is greater than the decrease in the applied force; this is due to expansion of the composite, whose thickness increases from 5.6 to 8.4 mm.

Shear strength is assimilated to the tensile strength of the geopolymeric matrix. The latter also decreases with increasing temperatures:

TABLE 3

| tensile strength of the matrix after temperature treatment for 1 hour | | | | | | |
|---|---|---|---|---|---|---|
| Temperature Tensile strength matrix | 20° C. | 200° C. | 400° C. | 600° C. | 800° C. | 1000° C. |
| Example 1 | 14 MPa | 12.5 MPa | 6.8 MPa | 4.6 MPa | 4.6 MPa | 5.6 MPa |
| Example 2 | 15 MPa | 13 MPa | 8 MPa | 6 MPa | 6 MPa | 7.5 MPa |

The $^{27}Al$ NMR spectrum exhibits a resonance at 55±5 ppm. The sialate bridge cross-linking site (—Si—O—Al—O—) of the matrix is of the type $K_2$-(A4S), with empirical formula $M_2Si_4AlO_{16}$. The expansion of nearly 50% of the geopolymeric matrix is due to the fact that the polysilicate chains of the polymeric phase are subject to very little cross-linking, the majority of the sialate bridge cross-linking being at the surface of the nanosphere. The nanocomposite contains 70 parts by weight of the nodular siliceous phase and 30 parts by weight of the polymeric poly(alumino-silicate) phase. The $^{29}Si$ MASNMR spectrum exhibits three resonances: −87±5 ppm, −98±5 ppm and −107±5 ppm.

EXAMPLE 2

21 g of kaolinite are added to the alkali silicate solution of the mixture in example 1, to obtain 266 g of a reaction mixture containing:

$H_2O$: 3.5 moles;

$K_2O$: 0.276 moles;

$SiO_2$: 2.671 moles;

$Al_2O_3$: 0.1207 moles.

The mole ratios of reacting oxides are equal to:

$K_2O/SiO_2$ 0.103

$SiO_2/Al_2O_3$ 22.129

$K_2O/Al_2O_3$ 2.286

A composite specimen is prepared as in example 1. The thickness increases by 25% between 20° C. and 800° C. and the strengths at high temperature are greater (see Table 3), with a flexural strength of 95 MPa at 800° C.

The $^{27}Al$ NMR spectrum exhibits resonances at 65±5 ppm and 55±5 ppm. The sialate bridge (—Si—O—Al—O—) cross-linking site of the matrix is of the type $K_2$-(A4S) and $K_3$-(A3S), with empirical formula $M_2Si_4AlO_{16}$ and $M_3Si_3AlO_{13}$. The 25% expansion of the geopolymeric matrix indicates that the polysilicate chains of the polymeric phase are cross-linked, the sialate bridge cross-linking being at the surface of the nanosphere and also between the poly(silicate) chains. The nanocomposite contains between 65 parts by weight of the nodular siliceous phase and 35 parts by weight of the polymeric poly(alumino-silicate) phase. The $^{29}Si$ MASNMR spectrum is wide with three resonances: −87±5 ppm, −98±5 ppm and −107±5 ppm.

EXAMPLE 3

2259 grammes of a reaction mixture are prepared containing:

$H_2O$: 28.14 moles;

$K_2O$: 2.64 moles;

$SiO_2$: 23.69 moles;

$Al_2O_3$: 0.67 moles.

$Al_2O_3$ is from an amorphous aluminosilicate oxide prepared by plasma torch at 2400° C. using a natural alumino-silicate, its mean formula lying between ($13SiO_2.AlO_2$) et ($16SiO_2$, $AlO_2$); the $SiO_2$ comes from this aluminosilicate oxide and a solution of potassium silicate with a mole ratio $K_2O/SiO_2$ close to 1; $K_2O$ comes from potassium silicate. The mole ratios of reacting oxides are:

$K_2O/SiO_2$ 0.11

$SiO_2/Al_2O_3$ 35.35

$K_2O/Al_2O_3$ 3.94

A carbon fiber fabric is impregnated with the reaction mixture of example 3. The ratio after spin drying between fiber weight and resin weight is 60/40 respectively. A composite containing 10 layers of impregnated fabric is prepared and this is then placed under vacuum at ambient temperature for 60 minutes in order to remove as much water as possible. The composite is next placed in a heating press at 80° C. for 3 hours. It can also be placed under vacuum at 80° C. for 3 hours. The composite obtained has a flexural strength of 200 MPa and is temperature stable to 1000° C., enabling fabrication of an excellent fire-resistant structure.

EXAMPLE 4

Two composites are made as for Example 3, except that they are placed either side of a 10 mm layer of cellular Nomex. Hardening is carried out under a heating press. A light fire-resistant panel of high mechanical strength is obtained.

EXAMPLE 5

42 g of kaolinite and 10 g of water are added to the alkali silicate solution of the mixture as in Example 1 to obtain 297 grammes of a reaction mixture containing:

$H_2O$: 4.22 moles;
$K_2O$: 0.276 moles;
$SiO_2$: 2.833 moles;
$Al_2O_3$: 0.2827 moles The mole ratios of reacting oxides are as follows:

$K_2O/SiO_2$ 0.097
$SiO_2/Al_2O_3$ 10.02
$K_2O/Al_2O_3$ 0.976

A composite is made as for Example 1. The thickness increases by 5% between 20° C. and 800° C.

The $^{27}Al$ NMR spectrum exhibits resonance peaks at 70±5 ppm, 65±5 ppm and −55±5 ppm. The sialate bridge cross-linking sites (—Si—O—Al—O—) of the matrix are of the type $K_2$-(A4S), $K_3$-(A3S) and $K_4$-(A2S). The low expansion of the geopolymeric matrix indicates that the polysilicate chains in the polymeric phase are highly cross-linked, the sialate bridge cross-linking being at the surface of the nanosphere and between poly(silicate) chains. The nanocomposite contains 60 parts by weight of the nodular siliceous phase and 40 parts by weight off the polymeric poly(alumino-silicate) phase.

These composites can be used to produce a structure enabling production of high efficiency air filters of class EU8 and EU9 which are fire-resistant. Depending on the type of reinforcing fiber, these air filters may be used in continuous service, for example with alumina fiber at a temperature <1000° C., and with silicon carbide fiber at temperatures >1000° C. The luting seal is designed according to the type of filtering material used and the temperature of use. This luting is made from geopolymeric resin of the poly(sialate-disiloxo) type (K)-PSDS, or fluoro-poly(sialate-disiloxo) (F,K,Na)-PSDS.

All workers in the field will readily appreciate the advantages of the process for fabrication of ceramic-geopolymeric composite materials of this invention, especially when the thermal properties of containing carbon fiber or graphite are considered. Using techniques of the prior art, to obtain a composite material stable at temperatures up to 1000° C., either the carbon fiber had to be specially treated by vapor phase deposition techniques (silicon carbide or silicon nitride vapor), or a SiC fiber reinforcement, for example of the Nicalon type, had to be used. Now SiC fiber and special treatments are very costly, which limits their use. For comparison, and for equivalent mechanical properties, carbon fiber is twenty times cheaper than Nicalon SiC. The economic advantage of the process described in this invention is thus clear. Naturally, this geopolymeric matrix may also be used in conjunction with any other fibrous reinforcement and numerous other reinforcements for the fabrication off composite materials. One example is mica and similar particles to fabricate materials stable at high temperatures. The worker in the field may also add to the reaction mixtures any extra organic or inorganic material known for its capacity to increase the penetration and/or reduce the amount of air trapped in the matrix. Various modifications may thus be introduced by the worker in the field to the geopolymeric matrix and to the process which has just been described simply as an example, whilst staying within the terms of the invention.

We claim:

1. An alkali alumino-silicate geopolymeric matrix for composite materials with fibrous reinforcement, whose composition after dehydration is of the formula:

$$yM_2O:Al_2O_3:xSiO_2$$

where x is a value lying between 6.5 and 70, y is a value lying between 0.95 and 9.50, and M is either Na, K or a mixture Na+K, wherein the geopolymeric matrix is composed of a nanocomposite with at least two phases, comprising (a) a first nodular siliceous phase composed of nanospheres of diameter smaller than 1 micron;

(b) a second polymeric phase, composed of alkali poly (alumino-silicate) having at least one or several sialate bridge (—Si—O—Al—O—) cross-linking sites, the cross-linking site having an empirical formula lying between $M_4Si_2AlO_{10}$ and $M_2 Si_4AlO_{16}$, such that in this alkali alumino-silicate, the ratio $(SiO_4):(AlO_4)$ is >3.5, the geopolymeric matrix having a $^{29}Si$ MASNMR spectrum exhibiting three resonances: −87±5 ppm, −98±5 ppm and −107±5 ppm.

2. A geopolymeric matrix according to claim 1) wherein in said second polymeric phase, a sialate bridge (—Si—O—Al—O—) cross-linking site has an empirical formula equal to $M_4Si_2AlO_{10}$ and is identifiable by the nuclear magnetic resonance spectrum , $^{27}Al$ MASNMR, at 70±5 ppm indicating that the coordination of the aluminum is $AlO_4$, of the type $AlQ_4(2Si)$, with the molecular formula (with M being K):

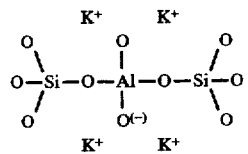

whereby, in geopolymeric terminology, the cross-linking site is thus potassium oligo (aluminate-disiloxo) $K_4$-(A2S) or $K_4:AlO_4:2SiO_3$.

3. A geopolymeric matrix according to claim 1) wherein in said second polymeric phase, a sialate bridge (—Si—O—Al—O—) cross-linking site has an empirical formula equal to $M_3Si_3AlO_{13}$ and is identifiable by the nuclear magnetic resonance spectrum $^{27}Al$ MASNMR, at 65±5 ppm, indicating that the coordination of the aluminum is $AlO_4$, of the type $AlQ_4(3Si)$, with the molecular formula (with M being K):

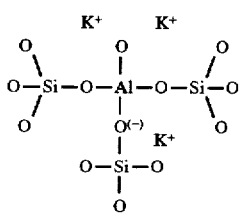

whereby, in geopolymeric terminology, the cross-linking site is thus potassium oligo (aluminate-trisiloxo) $K_3$-(A3S) or $K_3$:$AlO_4$:$3SiO_3$.

4. A geopolymeric matrix according to claim 1) wherein in second polymeric phase, a sialate bridge (—Si—O—Al—O—) cross-linking site has an empirical formula equal to $M_2Si_4AlO_{16}$ and is identifiable by the nuclear magnetic resonance spectrum $^{27}$Al MASNMR, at 55±5 ppm, indicating that the coordination of the aluminum is $AlO_4$, of the type $AlQ_4(4Si)$, with the molecular formula (with M being K):

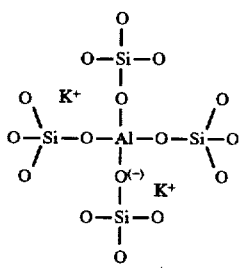

whereby in geopolymeric terminology, the said cross-linking site is thus potassium oligo (aluminate-tetrasiloxo) $K_2$-(A4S) ou $K_2$:$AlO_4$:$4SiO_3$.

5. An alkali alumino-silicate geopolymeric matrix for composite materials, according to claim 1, wherein the nanocomposite contains 60 to 95 parts by weight of the nodular siliceous phase for 05 to 40 parts by weight of the polymeric phase.

6. A composite material containing fibrous reinforcement and a geopolymeric matrix according to claim 1.

7. A composite material according to claim 6, wherein the fibrous reinforcement contains carbon fibers or graphite, the composite material resisting oxidation up to 1000° C.

8. A process for the preparation of a geopolymeric matrix according to claim 1, wherein it consists of preparing and then allowing to stand a reaction mixture composed of alumino-silicate oxide of composition between ($2SiO_2$, $AlO_2$) and ($34SiO_2$,$AlO_2$), and of an aqueous alkali silicate solution, such that the mole ratios of reaction products are between:

$K_2O/SiO_2$ 0.08 and 0.145

$SiO_2/Al_2O_3$ 6.50 and 70

$K_2O/Al_2O_3$ 0.95 and 9.50 and then hardening at a temperature between 60° C. and 200° C., without the addition of any product used to harden alkali silicate solutions.

9. A process according to claim 8 wherein when said alumino-silicate oxide has a composition between ($24SiO_2$, $AlO_2$) and ($34SiO_2$,$AlO_2$), and there are added to hundred parts by weight of said aqueous alkali silicate solution, 0 to 40 parts by weight, of a hydrated alumino-silicate with the Al cation in coordination ($AlO_6$).

10. A process for making a composite material thermo-stable at high temperatures, composed of reinforcing fibers and a geopolymeric matrix according to claim 1, comprising impregnating the reinforcing fibers with a reaction mixture obtained by mixing:

(a) a powder containing principally an alumino-silicate oxide with a formula between ($2SiO_2$,$AlO_2$) and ($34SiO_2$,$AlO_2$);

(b) an aqueous alkali silicate solution; such that the mole ratios of reaction products expressed in terms of oxide lie between:

$K_2O/SiO_2$ 0.08 and 0.145

$SiO_2/Al_2O_3$ 6.50 and 70

$K_2O/Al_2O_3$ 0.95 and 9.50 and then subjecting the reaction mixture to a hydrothermal polycondensation at a temperature between 60° C. and 200° C. without the addition of any product used to harden alkali silicate solutions, whereby after polycondensation, the nuclear magnetic resonance spectrum MASNMR for $^{27}$Al of the said geopolymeric matrix shows that the coordination of the aluminum is $AlO_4$, of at least one of the type of $AlQ_4$ (2Si), $AlQ_4$ (3Si) and $AlQ_4$(4Si).

11. A process for making a composite material thermo-stable at high temperatures, composed of reinforcing fibers and a geopolymeric matrix according to claim 1, comprising impregnating the reinforcing fibers with a reaction mixture obtained by mixing:

(a) a powder containing principally an alumino-silicate oxide with a formula between ($24SiO_2$,$AlO_2$) and ($34SiO_2$ .$AlO_2$)

(b) a liquid obtained by adding, for a hundred parts by weight of said aqueous alkali silicate solution, from 0 to 40 parts by weight, and optionally 5 to 30 parts by weight, of a hydrated alumino-silicate with the Al cation in coordination ($AlO_6$) such that the mole ratios of reaction products expressed in terms of oxide lie between:

$K_2O/SiO_2$ 0.097 and 0.11

$SiO_2/Al_2O_3$ 10 and 55

$K_2$ /$Al_2O_3$ 0.97 and 6.10 and then subjecting the reaction mixture to a hydrothermal polycondensation at a temperature between 60° C. and 200° C., without the addition of any product used to harden alkali silicate solutions, whereby nuclear magnetic resonance spectrum $^{29}$Si MASNMR is wide and exhibits three principal resonances at −87±5 ppm, −98±5 ppm and −107±5 ppm.

12. A geopolymeric matrix according to claim 1 wherein said nanospheres have a diameter smaller than 500 nm.

13. A geopolymeric matrix according to claim 12 wherein the ratio $SiO_4$:$AlO_4$ in the alkali alumino silicate is greater than 5.

14. A geopolymeric matrix according to claim 1 wherein the ratio $SiO_4$:$AlO_4$ in the alkali alumino silicate is greater than 5.

15. A composite material containing fibrous reinforcement and a geopolymeric matrix according to claim 5.

16. A composite material according to claim 15, wherein the fibrous reinforcement contains carbon fibers or graphite, the composite material resisting oxidation up to 1000° C.

17. A composite material containing fibrous reinforcement and a geopolymeric matrix according to claim 12.

18. A composite material according to claim 17, wherein the fibrous reinforcement contains carbon fibers or graphite, the composite material resisting oxidation up to 1000° C.

19. A composite material containing fibrous reinforcement and a geopolymeric matrix according to claim 13.

20. A composite material according to claim 19, wherein the fibrous reinforcement contains carbon fibers or graphite, the composite material resisting oxidation up to 1000° C.

* * * * *